Figure 1:
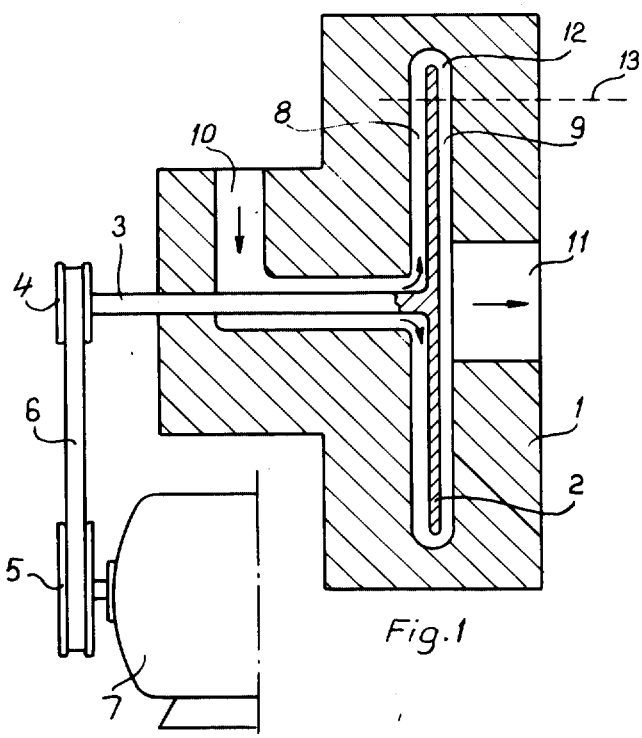

United States Patent [19]

Stenstrom

[11] 4,004,553
[45] Jan. 25, 1977

[54] HEAT TREATING APPARATUS FOR LIQUIDS

[75] Inventor: Lennart Arvid Stenstrom, Huddinge, Sweden

[73] Assignee: Alfa-Laval AB, Tumba, Sweden

[22] Filed: Mar. 19, 1975

[21] Appl. No.: 559,664

[30] Foreign Application Priority Data

Mar. 25, 1974 Sweden .......................... 74039637

[52] U.S. Cl. .................................. 122/26; 126/247; 165/86
[51] Int. Cl.² ........................................... F22B 3/06
[58] Field of Search ...................... 122/26; 165/86; 126/247

[56] References Cited

UNITED STATES PATENTS

| 1,682,102 | 8/1928 | Allen | 126/247 |
| 2,312,996 | 3/1943 | Bethenod | 122/26 |
| 3,793,848 | 2/1974 | Eskeli | 165/86 |

FOREIGN PATENTS OR APPLICATIONS

| 371,529 | 3/1923 | Germany | 122/26 |
| 380,211 | 9/1923 | Germany | 126/247 |
| 207,839 | 3/1940 | Switzerland | 126/247 |

Primary Examiner—Kenneth W. Sprague
Attorney, Agent, or Firm—Cyrus S. Hapgood

[57] ABSTRACT

One of a plurality of members is rotated by driving means relative to another member around an axis, the members forming between them a narrow passage extending around the rotation axis and serving for through-flow of a liquid to be heat treated, the driving means effecting relative movement between the walls defining the narrow passage, so that the liquid flowing therethrough is heated by internal friction in the liquid. The passage has a liquid inlet spaced from the rotation axis; and the passage extends from this inlet, via a point spaced a greater distance from the axis than is the inlet, to a liquid outlet located closer to the axis than is said point. Liquid flowing through the passage from the inlet to the outlet is heated by internal friction substantially in a small part of the passage located farthest from the axis; and one of the members is operable to transfer heat from liquid situated in the passage, and which has passed the passage part farthest from the axis, to liquid which is on its way in the passage to the part farthest from the axis.

20 Claims, 13 Drawing Figures

HEAT TREATING APPARATUS FOR LIQUIDS

The present invention relates to an apparatus for heat treatment of a liquid at a predetermined temperature by causing internal friction in the liquid. The apparatus comprises at least two members and driving means for rotating at least one of these members relative to the other around a rotational axis, the members being formed and placed relative to each other so that there is formed between them a narrow passage extending around said axis and serving for the through flow of liquid to be heat treated in the apparatus, the driving means being arranged to cause a relative movement between the walls defining said narrow passage, so that liquid flowing therethrough is heated by internal friction in liquid.

An apparatus of this kind is disclosed in Swedish Pat. No. 357,876. This apparatus comprises a stationary housing and a circular disc rotatable therein. Between the disc and the housing is a narrow interspace wherein liquid is heated by internal friction. During the operation of the apparatus, liquid is conducted from the center of the disc on both sides of it to the periphery of the same, where the surrounding housing has a small number of apertures along the periphery of the disc, constituting the outlet of the apparatus for heat treated liquid.

The previously known apparatus has several important drawbacks which make it unsuitable for rapid heat treatment of liquids at high temperature. This prior apparatus has no means for cooling the heated liquid. Such cooling is supposed to be performed outside the apparatus by means of conventional heat exchanging equipment, such as plate heat exchangers. This prolongs the period of time during which the liquid is kept at the high temperature generated in the apparatus. The apparatus seems to be well suited for rapid heating of a liquid to a high temperature, but it is not arranged to cool the liquid rapidly from this high temperature. Further, it is not possible by means of this prior apparatus to obtain uniform heat treatment of liquid. Owing to the fact that the housing has only a few outlets at the periphery of the rotatable disc, each liquid particle which has been sufficiently heated in the interspace between the disc and the housing will not immediately leave the apparatus. Some particles will thus remain in the area outside the periphery of the disc for a period of time before they find their way out through the outlets. Since the temperature is highest in this particular part of the apparatus, even a short extra duration of time in this area for some liquid particles may be damaging for, or even spoil, the entire heat treatment effect, as by causing undesired changes of taste of the treated liquid.

An object of the present invention is to avoid the above-mentioned drawbacks of an apparatus of the kind described and thus provide a rapid and uniform heat treatment of liquids at high temperature.

In an apparatus according to the invention, the passage between the mutually movable members, as seen in a section along the rotational axis, extends from a liquid inlet situated at a certain distance from this axis, via a point situated at a larger distance from the axis, to a liquid outlet situated closer to the axis than the said point is situated. Also, the members are formed so that liquid flowing through the passage from the inlet to the outlet is heated by internal friction substantially in a small part of the passage situated farthest away from the axis, and one of the members is arranged to conduct heat and to transfer heat from liquid which is present in the passage, and which has passed its part farthest away from the axis, to liquid which is situated in the passage but is on its way to the part of the passage situated farthest away from the axis.

By concentrating the frictional heating of the liquid to the part of the liquid passage situated farthest away from the axis, a regenerative cooling of the liquid is possible which is substantially as rapid as the heating of the liquid. Owing to the extension of the liquid passage along the whole of its length around the axis, a uniform heat treatment of liquid is also made possible, all parts of the liquid having the same length of their flow paths through the apparatus and being prevented from remaining for different periods of time in the part of the passage where the highest temperature prevails.

As previously mentioned, the apparatus comprises at least two members defining the narrow passage for liquid to be heat treated. If the apparatus comprises only two members for defining this passage, only one of these members must be rotatable relative to the other. If the apparatus comprises three members for defining the passage, at least two of the members must be rotatable, and these two members must be rotatable at different speeds or in different directions.

Figure 7:
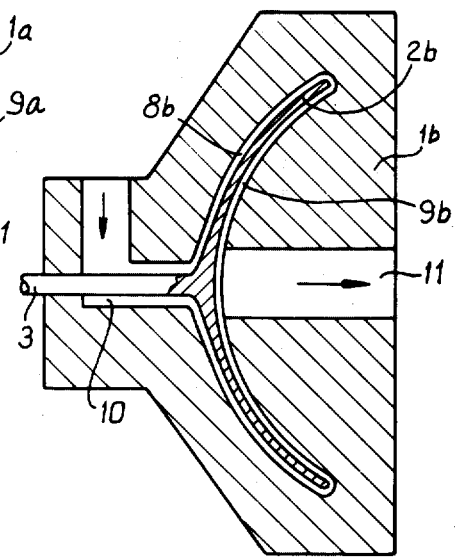
Figure 8:
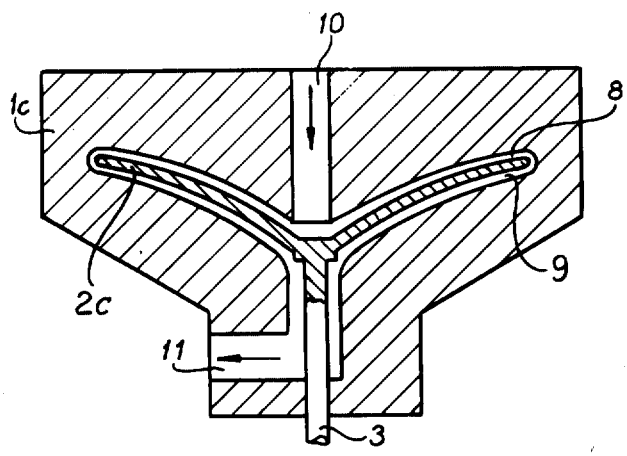
Figure 9:
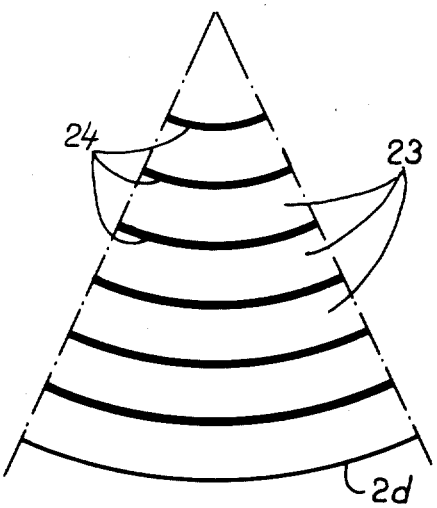
Figure 10:
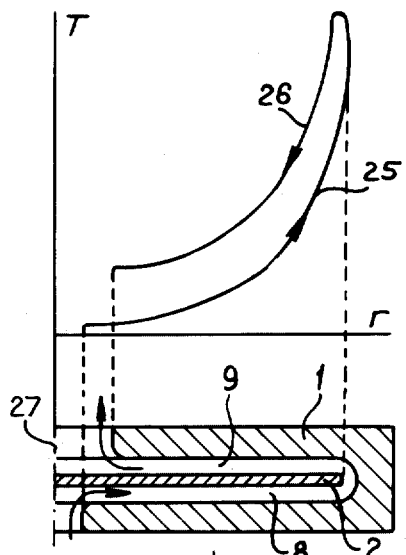
Figure 11:
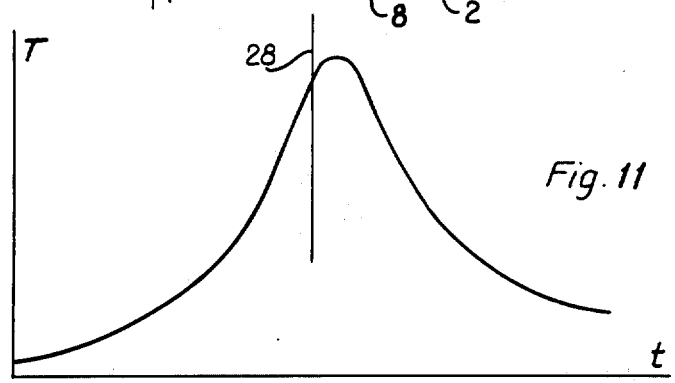
Figure 12:
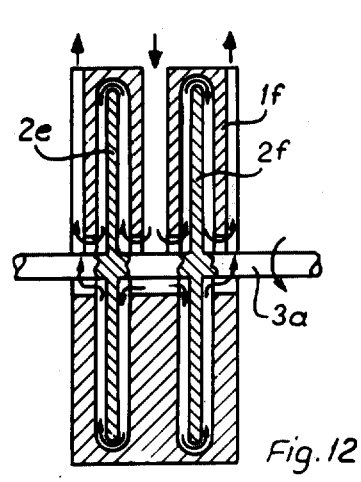
Figure 13:
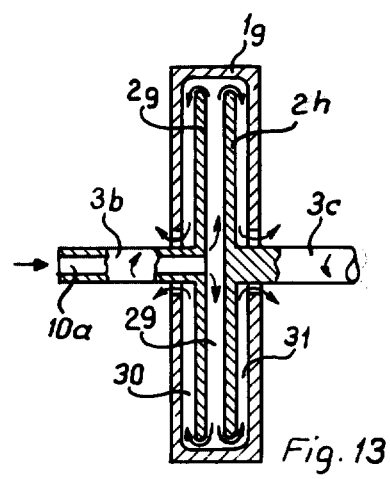

The invention is further described with reference to the accompanying drawings in which FIGS. 1–8 are longitudinal sectional views of different embodiments of the apparatus according to the invention; FIG. 9 is a face view of part of a disc intended for rotation in the apparatus; FIGS. 10 and 11 show temperature effects for liquid treated in the apparatus; and FIGS. 12 and 13 are longitudinal sectional views of two embodiments of the apparatus.

The apparatus of FIG. 1 comprises a housing 1 and a circular disc 2 therein made of heat conducting material. The disc is carried by a driving shaft 3 which, via two belt pulleys 4, 5 and a belt 6, is connected to a motor 7. Sealings, bearings and the like are not shown in the drawing for the sake of clarity.

The housing 1 forms, together with the disc 2, two interspaces 8 and 9 situated on opposite sides of the disc. The interspaces 8 and 9 extend around the rotational axis of the disc 2 and communicate with each other along the entire periphery of the disc. The interspace 8 communicates with a central inlet channel 10, while the interspace 9 communicates with a central outlet channel 11. Liquid to be heat treated in the apparatus flows through the inlet channel 10, then through the passage formed by the interspaces 8 and 9, and finally out of the apparatus through the outlet channel 11, as shown by arrows in FIG. 1.

In practice, the distance between disc 2 and the opposite walls of the housing 1 (i.e., the width of the interspaces 8 and 9) is chosen so that the rotation of the disc relative to the housing will generate turbulence and heat by internal friction in the liquid flowing through the interspaces. The relative velocity between adjacent parts of the housing and the disc in the interspaces 8 and 9 increases proportionally with the distance from the axis of the disc. By suitable dimensioning of the width of the interspaces, the degree of heat generation in different parts of the interspaces may be controlled. In the apparatus according to the invention, an objective is that the heat generated by internal friction be concentrated in a small part of the liquid passage, i.e., in the part of the passage situated farthest away from the axis of the disc. This part of the passage is designated 12 in FIG. 1 and is situated radially outside a dashed line 13. A concentration of the heat generation like this is automatically obtained in an apparatus according to FIG. 1 if the width of the liquid passage is the same along the whole of its extension. The part of the total heat generated in the passage by internal friction in the liquid can then be obtained in the passage part 12. The concentration of the generated heat will be especially pronounced if a turbulent flow is caused in the passage.

In operation, the apparatus also works as a preheater for liquid to be heat treated and as a cooler for liquid that has been heat treated. Heat will thus be transferred from liquid flowing through the interspace 9 to liquid flowing through the interspace 8, the disc 2 then working as a heat transferring means. This exchange of heat is extremely effective due to the relative movement between the disc and the housing and also due to the shape of the interspaces 8 and 9. For the heat transfer, it is also important that a turbulent flow be caused in the interspaces 8 and 9. The efficiency of the heat exchange and the uniformity of the preheating and cooling will be substantially higher with turbulent flow than with laminar flow in these interspaces.

Figure 2:
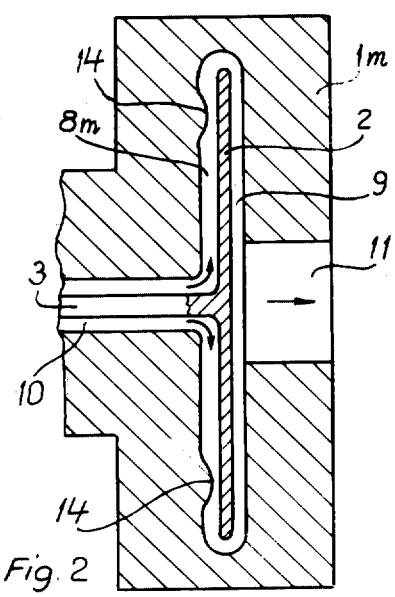

An important effect of the turbulence in the liquid passage is that the surfaces which define the passage are kept free from deposits from the through-flowing liquid. The turbulence should be especially strong in those parts of the liquid passage where the liquid will have a high temperature. FIG. 2 illustrates one possibility of increasing the turbulence in a certain part of the liquid passage, namely, the part situated farthest away from the axis of the disc 2. In FIG. 2, the housing 1m has an annular protuberance 14 in the interspace 8, which results in a reduction of the through flow area in a part of this interspace. This means that a stronger turbulence will be created in the through-flowing liquid immediately beyond this throttled part of the liquid passage, reckoned in the flow direction of the liquid in the passage. It also means that re-flow radially inwards of heated liquid is made much more difficult. Instead of one or more annular protuberances 14, several separate protuberances placed in a ring may be arranged in the interspace 8. Owing to the fact that liquid flowing through the interspace 8 will have a large movement component in the peripheral direction of the disc, separate protuberances of this kind would provide substantially the same kind of effect as a continuous annular protuberance 14.

Figure 3:
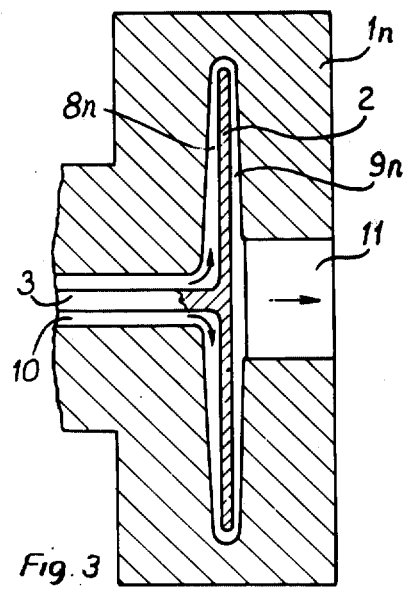

Since the interspaces 8 and 9 in FIG. 1 have the same width along the entire liquid passage, the through-flow area of the latter increases in the direction from the axis of the disc towards the periphery of the disc. By forming the housing 1n as shown in FIG. 3, it is possible to provide a liquid passage through the apparatus which has its through-flow area unchanged. It is also possible to provide in this way a liquid passage having a through-flow area decreasing towards the periphery of the disc. In both cases the regenerative heating of liquid flowing through the interspace 8, and the consequently obtained cooling of liquid flowing through the interspace 9, may be made stronger accelerated in the upper temperature range than is the case in the apparatus according to FIG. 1. In this way, the time during which the liquid is at high treatment temperature may be made especially short.

Figure 4:
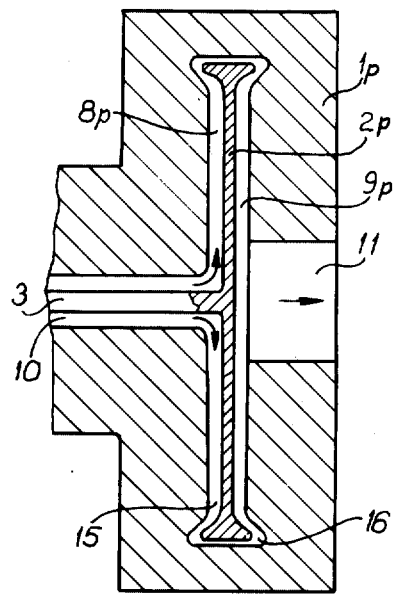
Figure 5:
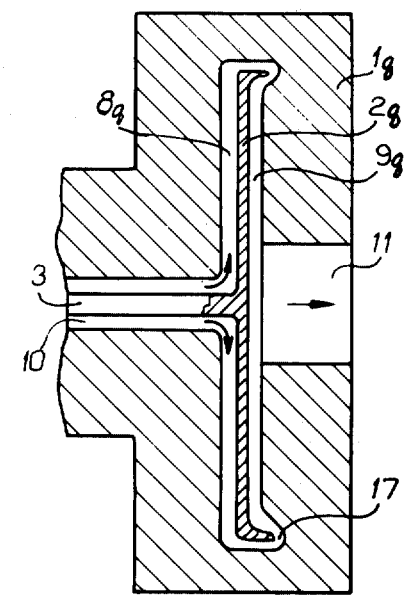

FIGS. 4 and 5 show embodiments of the apparatus in which the peripheral portion of the disc 2p or 2q has been given an enlarged surface intended to contact liquid flowing through the passage between the housing 1p or 1q and the disc. By such an expansion of the peripheral portion of the disc, with a corresponding expansion of the cavity in the housing, a greatly increased heat generation may be achieved in the liquid without the need of a substantial increase of the outer dimensions of the apparatus. The heat generation, as previously mentioned, is concentrated at the part of the liquid passage situated farthest from the axis of the disc. The possibility of increasing the turbulence of the through-flowing liquid (described in connection with FIG. 2) in these embodiments may be utilized so that a strong turbulence is obtained at the surfaces of the disc which face toward the axis of the disc and form a relatively small angle therewith. In the embodiment according to FIG. 4, the passage thus may be provided with the protuberances at a point 15 and if necessary at a point 16, while in the embodiment in FIG. 5 the passage may be provided with protuberances 17.

Figure 6:
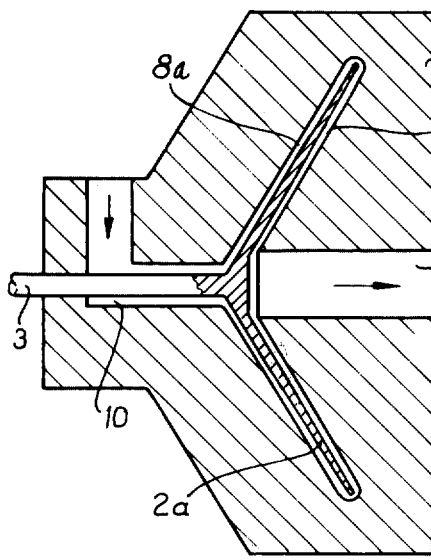

The thinner the rotatable heat transferring member, the more effective will be the heat conduction therethrough. In FIGS. 6–8, embodiments of the apparatus are shown in which this member may be made very thin. Instead of a circular, substantially plane disc, a thin walled member 2a, 2b or 2c having the form of a cone, a cup, or a bell, respectively, may be used as a rotatable heat transferring member. Members of this kind may be axially loaded more than a plane disc with the same thickness of material. As can be seen from FIG. 8, the apparatus may be arranged with the axis of the disc vertical, as for facilitating the cleaning of the apparatus.

A characterizing feature of the new apparatus is that the liquid passage therein has a width which, with regard to other operating conditions of the apparatus, such as the rotational speed of the disc 2 and the flow of liquid through the apparatus, is such that liquid flowing through the passage is brought into violent rotation. When liquid is to be heat treated in the apparatus at a temperature exceeding the boiling point of the liquid, it is preferred to dimension the liquid passage (i.e., the interspaces 8 and 9) so that the pressure created in the liquid due to centrifugal forces therein will become higher than the vapor pressure of the liquid at the particular heat treatment temperature and also will be so high that cavitation is avoided. This avoids the need for special equipment to obtain an overpressure in the liquid during the heat treatment.

The rotation of the liquid may be used also for propelling the liquid through the passage. This is possible, as can be seen from FIGS. 1–8, by allowing the interspace 8, which communicates with the liquid inlet of the apparatus, to extend closer to the axis of the disc than the interspace 9, which communicates with the liquid outlet of the apparatus. The pressure built up on the inlet side of the disc 2 in this way may be adjusted so that it will be sufficient for propelling the liquid against the pressure built up on the outlet side of the disc 2.

For intensifying the turbulence in the liquid passage, those parts of the surfaces of the disc and the housing which define the liquid passage may be rough, grooved or similarly uneven. By providing the surface of the disc with such an uneven structure only on the inlet side of the disc, the disc's entrainment of liquid in the passage may be improved, which may be necessary for building up a sufficiently high pressure in the liquid. Also, other means may be used for facilitating the entrainment of the liquid by the disc. The disc may, for instance, have straight or curved splines or the like on its surfaces facing to the passage. In the areas where the risk of incrustation on the disc or the housing is greatest, these elements preferably have entirely smooth surfaces, so that turbulence can keep the surfaces entirely free of incrustation. Splines of the abovenoted kind, placed on the disc or on the housing, may also be used as means for controlling the building up of pressure on both sides of the disc in a way such that the latter is not deformed.

In the apparatus according to the invention as described above, the disc 2 has been assumed to consist of a heat conducting material. Test runs have proved it possible to improve the heat transfer through the disc 2 by manufacturing the latter in a way such that heat conduction radially through the disc between two points on the disc, subjected to different temperatures, is made more dificult. FIG. 9 shows a sector of a disc 2d made by assembling several concentric and radially spaced annular elements 23 of a heat conducting material, and annular elements 24 arranged therebetween and consisting of a material which does not conduct heat to any substantial extent. A specific heat conducting property of the disc 2d may, of course, be achieved in many different ways.

By providing a specific heat conducting property of the member of the apparatus intended for the transfer of heat from already heated liquid to liquid to be heat treated, the housing 1 may be utilized as a heat conducting member. Thus, heat could be transferred from the part of the housing defining the interspace 9 to the part of the housing defining the interspace 8 via the part of the housing situated radially outside the peripheral edge of the disc.

It has been explained above how liquid flowing through the interspace 9 emits heat to liquid flowing through the interspace 8. In FIG. 10 the reason for this is illustrated by means of a curve. Under the curve there are schematically shown parts of the housing 1 and the disc 2 according to the embodiment of the apparatus in FIG. 1. A dash-dot line 27 indicates the rotational axis of the disc 2. The curve has two parts 25 and 26. The curve part 25 illustrates the temperature changes of the liquid flowing through the interspace 8, while the curve part 26 illustrates the temperature changes of the liquid flowing through the interspace 9. The abscissa of the coordinate system defines the distance ($r$) from the axis 27 of the disc 2, while the ordinate defines the temperature (T) of the flowing liquid. As can be seen from FIG. 10, parts of the liquid situated on different sides of the disc 2, but at the same distance from the rotational axis of the disc, have different temperatures, which means that a heat transfer through the disc 2 is possible.

FIG. 11 shows another temperature effect of liquid flowing through an apparatus of the kind shown in FIG. 1. In this case the abscissa of the coordinate system defines the time ($t$) while the ordinate defines the temperature (T) of the flowing liquid. The temperature curve in FIG. 11 is cut by a vertical line 28. The point where the line 28 cuts the temperature curve indicates when liquid passes the edge of the disc 2 in the passage between the latter and the housing 1 (FIG. 1). To the left of the line 28 there are thus shown temperature changes of the liquid when it flows through the interspace 8 in the apparatus, while to the right of the line 28 there are shown temperature changes of the liquid when it flows through the interspace 9. The inclination of the curve is a measurement of the supply of heat to the liquid. The negative inclination in the right part of the figure thus means that heat is given up by the liquid (i.e., the liquid is cooled). The reason why the inclination of the curve is not zero at the line 28 is that the liquid at this stage (i.e., when it passes the edge of the disc 2) is still charged with heat energy but is not yet subjected to any cooling by regenerative heating of the incoming liquid.

From the curve in FIG. 11, it can also be seen that the heating of the liquid in the interspace 8 is strongly accelerated in the upper temperature range, as is also the cooling of the liquid in the interspace 9. One reason for this is that the relative movement between the disc and the housing increases with the distance from the rotational axis of the disc. The acceleration of the heating and cooling of the liquid will be even stronger in an apparatus according to the embodiment shown in FIG. 3, because in this case the time during which liquid is in the outermost hot part of the passage will be especially short.

If several discs of the kind described above are provided, it is possible to use heat leaking to the housing in a part thereof for heating liquid which has not yet reached its maximum treatment temperature in another part of the housing. By means of a proper module arrangement, it is also possible to reduce to a minimum inevitable heat losses to the surroundings. In FIG. 12 there is shown a module comprising two discs 2e and 2f arranged in a common housing 1f and supported therein by a single shaft 3a. One example of a flow path for liquid to be heat treated in this apparatus is illustrated by arrows. Several modules of this kind may be included in an apparatus for the heat treatment of liquid.

In FIG. 13, the apparatus comprises a housing 1g and two plane, circular discs 2g and 2h each supported by a single shaft 3b and 3c, respectively. By means of a driving arrangement (not shown), the discs 2g and 2h are rotated in different directions. Liquid to be heat treated in the apparatus is supplied through the shaft 3b, which for this purpose has an inlet channel 10a. The inlet channel 10a opens into a disc-like interspace 29 between the two discs 2g and 2h, wherein incoming liquid is caused to flow in a direction towards the periphery of the discs. At the periphery of the discs, the channel 29 formed between the discs is divided into two branches, one of which, designated 30, is formed between the disc 2g and the housing 1g. The other branch 31 is formed between the other disc 2h and the housing 1g. From the periphery of the discs 2g and 2h, the liquid will flow through these channel branches back to the rotational axis of the discs and thence out through two central outlet openings in the housing 1g, as illustrated by arrows in the drawing.

As mentioned above, the discs 2g and 2h in this embodiment of the apparatus are arranged to rotate in different directions. This makes it possible, with a low rotational speed of the discs, to obtain a large relative movement between the peripheral edge portions of the discs, which portions define together the radially outermost part of the interspace 29.

An apparatus according to the invention can be provided with an extremely high regenerative degree of efficiency. This high regenerative degree of efficiency, to a large extent, is a result of the violet turbulence created in the heat exchanging part of the apparatus.

The turbulence has three functions in this connection. Firstly, the turbulence contributes in creating a high film coefficient of heat transfer between the liquid and the heat exchanging surfaces of the apparatus. Secondly, the turbulence causes an effective transportation of heat within the liquid. Thirdly, the turbulence keeps the heat exchanging surfaces free from deposits which would otherwise burn on and decrease the regenerative heat exchange, thereby requiring that the operation be interrupted for cleaning of the apparatus.

The last mentioned function of the turbulence also contributes in obtaining a uniform heat treatment of the liquid by keeping the regenerative heat transfer unchanged during the entire period of operation of the apparatus.

As previously mentioned, it is desirable to intensify the turbulence in the small part of the liquid passage where a high temperature will prevail. Accordingly, it is normally suitable to cause a more violent turbulence between the abovementioned small part of the liquid passage and the outlet of the apparatus than between the small passage part and the inlet of the apparatus. Such a stronger turbulence in this outlet part of the liquid passage than in its inlet part is automatically obtained in the apparatus according to the invention because different flowing conditions will prevail in these parts of the passage. This is due to the fact that the liquid at its entrance into the inlet part does not rotate and is only gradually brought to full rotational speed, while liquid at its entrance into the outlet part has already attained a high rotational speed, which thereafter is further increased as liquid moves toward the rotational axis.

The difference between the turbulence in the outlet part and the turbulence in the inlet part of the liquid passage may be influenced in a desired direction in different ways. Thus, difference as to turbulence may be reduced by forming the apparatus according to FIGS. 6 and 7. The difference as to turbulence may also be increased, however, as by use of the principles of the construction of the apparatus shown in FIG. 8.

The actual operating conditions for the apparatus determine in which direction the said difference between the degrees of turbulence in the different liquid passage parts should be influenced. If the apparatus is to receive a relatively small flow of liquid per unit of time, the effects of the above-mentioned different flow conditions will not be particularly great. It may then be suitable to make the turbulence in the outlet part of the liquid passage stronger, as by means of an arrangement according to FIG. 8. If the apparatus is to receive a large amount of liquid per unit of time, it may be necessary to increase the turbulence in the inlet part of the liquid passage and to decrease the turbulence in the outlet part of the liquid passage, as in the manner shown in FIGS. 6 and 7.

Another possibility of obtaining different degrees of turbulence in the inlet part and outlet part of the liquid passage is to give different widths to these passage parts. For setting a suitable relation between the widths of the inlet part and the outlet part of the liquid passage, one of the members of the apparatus may be axially displaceable relative to the other, possibly during the operation of the apparatus.

It has been mentioned above that regenerative heat exchange takes place through the heat conducting body of the apparatus radially inside the small part 12 of the liquid passage. However, a very extensive heat exchange takes place also through the portion of the heat conducting member situated farthest from the rotational axis, i.e., through the disc's edge portion in the small passage part 12. For further improvement of the regenrative degree of efficiency of the apparatus, the outermost edge portion of the disc, therefore, may be made thinner than the rest of the disc, i.e., as thin as possible with regard to the stability of the disc. FIG. 6 illustrates such a shape of the edge portion of the disc.

Due to its high regenerative degree of efficiency, the apparatus according to the invention may be made very compact. It can be used in all connections where a liquid is to be heated rapidly, as for sterilization, and thereafter rapidly cooled. it is especially suitable for the heat treatment of the milk, since it has also proved effective as a homogenizer. With a minimum of energy, milk thus may be both pasteurized (or sterilized) and homogenized in the same operation by means of the new apparatus.

As will be observed from FIG. 8, the apparatus has its liquid inlet 10 located radially inside its liquid outlet 11. Similarly, in FIG. 13 the liquid inlet 10a in shaft 3b is located radially inside each of the four liquid outlets in housing 1g. Consequently, these embodiments are examples where a pumping effect is provided on the liquid in the direction from the inlet to the outlet.

I claim:

1. Apparatus for heat treatment of a liquid at a predetermined temperature, the apparatus comprising at least two members and driving means for rotating at least one of the members relative to the other around a rotational axis, said members forming between them a narrow passage extending around the rotational axis and serving for through-flow of said liquid, said driving means being operable to effect relative movement between the walls defining the narrow passage, whereby liquid flowing through the passage is heated by internal friction in the liquid, said passage, as viewed in a section along the rotation axis, having a liquid inlet spaced from said axis and extending from said inlet, via a point spaced a greater distance from said axis than is said inlet, to a liquid outlet located closer to said axis than is said point, the apparatus being characterized in that one of said members is heat conducting and operable to transfer heat from liquid situated in the passage, and which has passed the passage part farthest from said axis, to liquid also situated in the passage but which is on its way to the passage part farthest from said axis, said members being formed so that most the temperature rise of the liquid flowing through said passage is caused by heat transfer through said heat conducting member, and so that the liquid is heated by internal friction substantially in a small part of the passage located farthest from the rotation axis, thereby providing for a rapid and uniform heat treatment of liquid at high temperature, including heating and subsequent cooling of the liquid.

2. The apparatus of claim 1, in which said passage-forming members include a housing and a central member surrounded by the housing.

3. The apparatus of claim 2, in which said central member is the heat conducting member.

4. The apparatus of claim 2, in which said central member is rotatable by the driving means, said housing being stationary.

5. The apparatus of claim 2, in which the central member is a substantially circular disc.

6. The apparatus of claim 5, in which the disc is planar.

7. The apparatus of claim 2, in which the central member is a thin-walled conical part.

8. The apparatus of claim 2, in which the central member is a thin-walled cup-like part.

9. The apparatus of claim 2, in which the central member is a thin-walled bell-shaped part.

10. The apparatus of claim 2, in which the central member includes a peripheral portion having a greater axial extension than the remainder of the central member.

11. The apparatus of claim 1, in which the surfaces of the members defining said passage are at least in part roughened.

12. The apparatus of claim 1, in which the width of said small part of the liquid passage is of the same order of magnitude as the width of the remainder of said passage.

13. The apparatus of claim 1, in which the width of the liquid passage decreases with increasing distance from the rotational axis.

14. The apparatus of claim 1, in which the walls defining the liquid passage are formed to provide a violent turbulence in said small part of the passage during said rotation.

15. The apparatus of claim 1, in which the walls defining the liquid passage are formed to create, during said rotation, a violent turbulence in the liquid passage between the rotational axis and said small passage part.

16. The apparatus of claim 1, in which the walls defining said liquid passage are arranged to create in the liquid in said small passage part, due to rotation of the liquid in said passage, a pressure greater than the vapor pressure of the liquid at the heat treatment temperature.

17. The apparatus of claim 1, in which said liquid inlet is located radially inside the liquid outlet, thereby providing a pumping effect on the liquid in the direction from the inlet to the outlet.

18. The apparatus of claim 1, in which the heat conducting member is substantially more heat conductive in one direction than in another direction.

19. The apparatus of claim 1, in which said members include two members rotatable relative to each other and forming between them a first part of the liquid passage, said members also including a stationary housing surrounding said two members and forming with each of said two members one branch of a second part of the liquid passage.

20. The apparatus of claim 19, in which said two rotatable members are rotated in different directions.

* * * * *